April 29, 1952 H. F. MAY 2,594,960

ELECTRICAL STORAGE AND SIGNALING SYSTEM

Filed Dec. 31, 1946 5 Sheets-Sheet 1

INVENTOR.
H.F. MAY
BY
[signature]
ATTORNEY.

April 29, 1952 H. F. MAY 2,594,960

ELECTRICAL STORAGE AND SIGNALING SYSTEM

Filed Dec. 31, 1946 5 Sheets-Sheet 2

INVENTOR.
H.F. MAY

BY

ATTORNEY.

April 29, 1952 H. F. MAY 2,594,960

ELECTRICAL STORAGE AND SIGNALING SYSTEM

Filed Dec. 31, 1946 5 Sheets-Sheet 3

INVENTOR.
H. F. MAY
BY
[signature]
ATTORNEY.

ELECTRICAL STORAGE AND SIGNALING SYSTEM

INVENTOR.
H. F. MAY

BY

[signature]
ATTORNEY.

April 29, 1952 H. F. MAY 2,594,960

ELECTRICAL STORAGE AND SIGNALING SYSTEM

Filed Dec. 31, 1946 5 Sheets-Sheet 5

INVENTOR.
H. F. MAY
BY
[signature]
ATTORNEY.

Patented Apr. 29, 1952

2,594,960

UNITED STATES PATENT OFFICE 2,594,960

ELECTRICAL STORAGE AND SIGNALING SYSTEM

Harold F. May, Valley Stream, N. Y., assignor to The Teleregister Corporation, New York, N. Y., a corporation of Delaware Application December 31, 1946, Serial No. 719,555

14 Claims. (Cl. 235—61)

This invention relates to a signaling system for storing electrical signal conditions representative of the numerical value of one or more items, in which the stored information automatically is transmitted to and displayed at a calling station in response to a request or check signal from such station, and in which the numerical value stored in regard to an item automatically is computed and changed by and in accordance with a request or order signal from a calling station.

Although not limited thereto, the invention is particularly applicable to reservation systems for airlines, railroads or other transportation lines, in which the number of seats or reservations currently available on a particular plane, train or other conveyance may be ascertained from one or more distant points. Heretofore, if a traveler in one city, for example, New York, requests information as to whether one or more reservations are available on a certain plane scheduled to leave from another city, such as Washington, the New York ticket seller or clerk generally has had to telegraph or telephone the Washington office to ascertain the information. This is likewise the case where branch ticket offices throughout larger cities have to communicate with the main ticket office or airport of that city to determine the information requested. This often entails an undesirably long wait and requires the services of additional personnel to supply the information, and moreover is subject to human error due to oral misunderstanding over the telephone or mistakes which may occur in telegraph messages. Furthermore, two or more requests concurrently received at an airport or other office from different ticket sellers or clerks with regard to reservations on the same plane sometimes lead to a misunderstanding with the unfortunate result that the same seat or space is sold to two different travelers. There is also a vexatious problem in the matter of reservations which may be cancelled, particularly when such cancellations are made shortly before the departure time of the plane, and it is often difficult to give notice of such cancellations by telephone or telegraph in time to enable the reservations to be sold to other passengers.

One of the objects of this invention is to avoid the foregoing disadvantages, and to enable the current numerical value, for example, the number of seats available at the time in a particular plane, train or other conveyance, automatically to be determined from, and read at, one or more remote places of inquiry without loss of time or manual intervention in the transmission of the stored information to the inquiring party or parties.

Another object is a signaling, storage and computing system in which the stored numerical information representing the instant value of an item currently is computed and changed in response to and in conformity with permutation code signals received from a calling station or stations, and in which the computation is directly effected in binary permutation code without the necessity of an intermediate translation into a series of unit impulses.

Still another object is a signaling system in which the number of available reservations in a particular plane, train or other conveyance are stored by means of signal conditions on electroresponsive storage devices and the number of such reservations automatically are caused to be displayed visually at a distant station in response to a request signal received from that station, the system having means whereby the stored information is computed and revised automatically in response to and in conformity with a request for reservations or a cancellation of reservations, from the distant station.

A further object is a system in which a plurality of groups of signal storage elements respectively may be assigned to different items to store information in regard thereto, the storage elements of each group having values assigned in geometric progression, each of which groups selectively may be seized by any of a plurality of calling stations for reading the stored information and for changing the stored information, with means for preventing seizure of any storage group by two or more calling stations at the same time.

These and other objects and advantages of the invention will be apparent from the following detailed description of one illustrative embodiment thereof, taken in connection with the accompanying drawings, in which.

Figure 1:
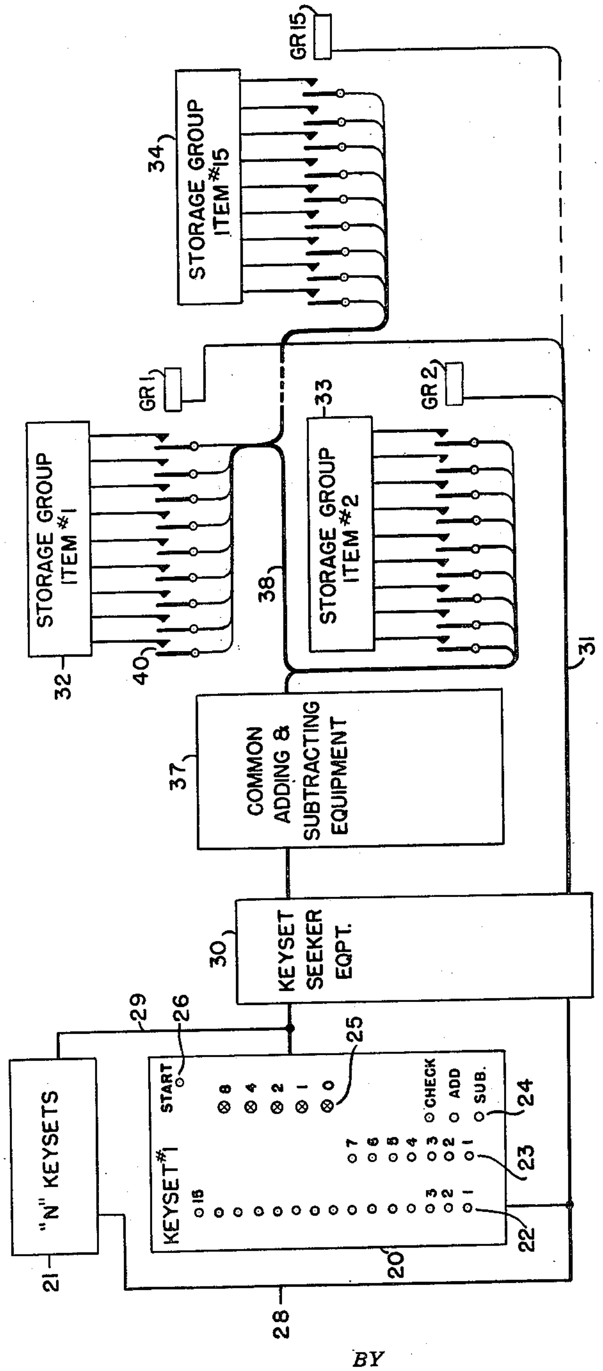
Fig. 1 is a diagram of various units of the signaling system showing their relation with respect to each other.

The operations of storing the desired information, reading the information and changing the stored information in regard to a plurality of items may be performed by any one of several clerks or other operators. Preferably, and in accordance with the illustrative embodiment disclosed herein, the information in regard to each item is in the form of a number which is stored electrically in a binary permutation code. The system is particularly adapted to store and transmit information in regard to the number of currently available seats or other reservations for each of a number of different flights or trips, but also is adapted to store and supply information in regard to the number of units of each of other items, such as units in a factory stock and the like.

The system is wholly electrical in nature and in general comprises three classes of components which are (1) signal storage groups, (2) operators' sets at calling stations, and (3) common finding and computing equipment. Each signal storage group corresponds to one item, such as a particular plane or train, and stores the number representing the information associated with that item. Each group comprises several electroresponsive storage elements, the number of such elements depending on the largest number to be stored. The storage elements may be electromagnetic relays, gas-filled tubes, or other storage devices that may be operated or released by electrical pulses. Preferably, a polarized magnetic lock relay which closes its contacts upon receipt of a pulse of opposite polarity is employed as each of the storage elements, such a relay being disclosed in U. S. Patent No. 2,447,632, which was granted August 24, 1948 to George L. Bush.

A number is stored as follows: Each element in a storage group has a numerical value associated with it, which values form a geometric progression. The usual values are 1, 2, 4, 8, etc., and the operation of the system for adding and subtracting depends upon the properties of such a progression. It is possible to form combinations of these values to obtain any number from 1 to the largest number within the capacity of the storage group without using any value more than once. For example, 1=1, 2=2, 3=1+2, 4=4, 5=4+1, 6=4+2, 7=4+1+2, etc. Thus any number can be stored by energizing the proper combination of storage elements and the number can be read by adding the values associated with the energized relays. This method of storage has the important advantage of permitting fast and easy additions and subtractions and of having a greater number capacity for the number of individual storage elements used than any other analogous system.

The second component referred to above comprises one or more operator's or clerk's keysets, each of which has means for selecting a desired storage group, with means for indicating the reading of the selected group, and for changing the reading of the group. In the embodiment illustrated herein, the group selection is performed by operating or depressing a push button or key corresponding to the desired storage group. This ultimately operates a relay which connects the storage group to certain common control equipment. The reading preferably is performed by a group of lights designated in the same manner as the individual elements in a storage group, the operator adding the indicated numbers to determine the stored number. Changing the information is accomplished by operating a push button or other key corresponding to the number to be added or subtracted, which keys are connected in permutation to outgoing conductors, and then operating an "add" or "subtract" key, and operating a "start" key.

The third component is the finding and computing equipment which is common to a plurality of groups of storage elements so that only one set of such equipment is required for each system. This equipment is described specifically hereinafter in connection with the operation of the system.

Referring to Fig. 1, there are diagrammatically illustrated a number of clerk's keysets, the rectangle 20 indicating one keyset and the rectangle 21 representing any desired number "N" of similar keysets which may be located either in the same office or in different offices for operation by a number of clerks or ticket sellers. At the left hand side of the keyset No. 1 is shown a row 22 of group selection locking keys which preferably are in the form of push buttons; these are used to select the particular group of storage elements on which the information, such as the number of available reservations in a certain plane, is stored. Fifteen keys are shown, enabling the selection of fifteen different groups of storage devices, but it will be understood that the number of selection keys will vary depending upon the number of different flights or other items concerning which information is to be made available. Adjacent to the row of selection keys is a row of keys 23, each of which represents a different number of reservations. A row 24 of keys determines the nature of the desired operation, such as to check the number of reservations available and to add or subtract reservations from the number currently available to keep the stored information up to date. A row 25 of indicating lamps enables the requested information in regard to available reservations to be displayed visually to the clerk or operator. The keyboard also contains a start key 26 for initiating a request or an order or release in regard to reservations.

The various keysets are connected electrically by cables 28 and 29 to seeker equipment 30 which is common to the various keysets and which enables the keysets to be connected, through a cable 31 and group selection relays GR1 to GR15, selectively to the various groups of storage devices, for example, relays, in regard to different items, of which the groups 32, 33 and 34 diagrammatically are shown. The various keysets also are selectively connected by the seeker to adding and subtracting equipment 37 which is common to the storage relay groups 32 to 34.

*Finding and selection circuits.*—The finding and selection circuits for connecting a particular operator's set and a particular signal storage group to the common equipment, and the method of operation of these circuits, are as follows: When the operator or clerk depresses the start button or key 26, Fig. 2, this causes ground potential on the spring of the start key to be applied concurrently to two circuits which comprise conductors 50 and 51, armatures and break contacts 52, 53 of an unoperated release relay RLS, conductors 54 and 55 to a seeker rotary switch RS, Fig. 4. Conductor 54 extends to the No. 1 terminal of a lower contact bank associated with the rotary switch and, when the rotary wiper arm 60 of the contact bank is on terminal 1, the ground potential on conductor 54 is extended by way of conductor 61 to the winding of a cut-off relay CO and thence to grounded battery. The rotary switch RS when energized steps from point to point automatically because its operating circuit includes auxiliary self-interrupting contacts 58. Its energizing circuit includes an armature and break contact 57 on cut-off relay CO, the self-interrupting contacts 58, and the operate winding of the rotary switch stepping magnet RS to grounded battery.

When the rotary switch has reached a position corresponding to the calling operator's key set, a circuit is completed through the lower switch bank and wiper 60 to operate the cut-off relay. Relay CO, upon operating, opens at its armature and break contact 57, the self-interrupting circuit of switch RS. The operation of relay CO also closes a circuit at its armature 62 and make contact, from ground over conductor 63, wiper arm 64 of the upper switch bank of the rotary switch, contact 1 of the switch bank, conductor 65, armature and break contact 66 of the unoperated release relay RLS, Fig. 2, and conductor 67 to the operate winding of the operator's set gang relay CN and thence to grounded battery, causing relay CN to operate. The armature 68 of this relay, upon operating, connects by means of cables 70 and 71 the operator's set to the computing equipment of Fig. 3.

Figure 2:
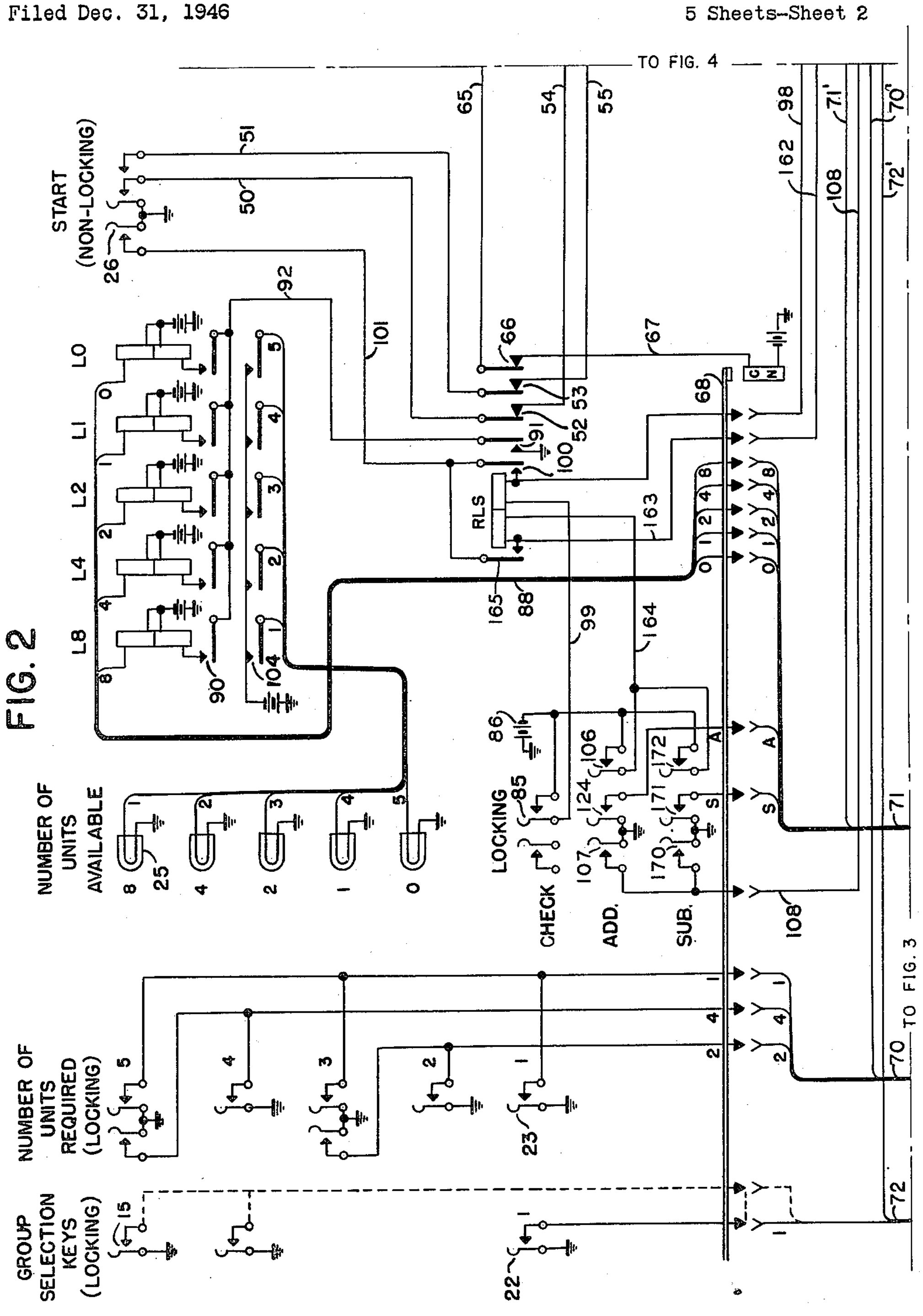
Fig. 2 illustrates a clerk's keyset, reading apparatus, and associated circuits.
Figure 5:
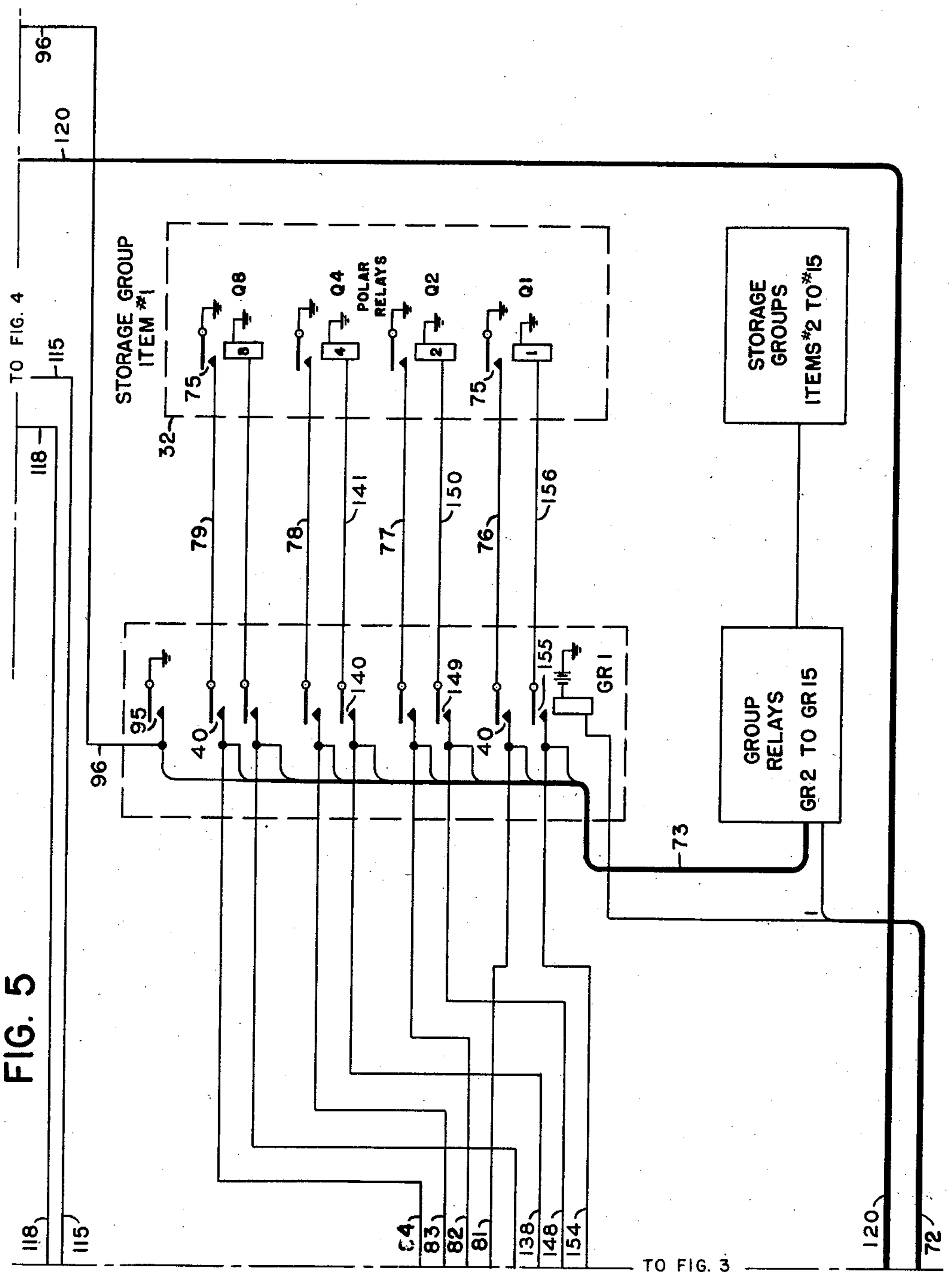
Fig. 5 shows storage relay groups on which information in regard to a plurality of different items respectively is stored.

Relay CN also connects, through a cable 72, the group selection keys 22 of Fig. 2 to the group relays GR1 to GR15, Fig. 5, these group relays being interconnected by a multiple conductor cable 73. The particular group selection key of Fig. 2 which was actuated before the switching operation began, now causes operation of the corresponding group gang relay of Fig. 5 and connects, through conductors such as 76 to 79, the desired storage group for one of the items Nos. 1 to 15, to the computing equipment, and the selecting operation is completed. Referring, for example, to group relay GR1, it will be seen that battery through the operate winding of the relay may flow through conductor 1 of cable 72, through the associated contacts controlled by armature 68 of relay CN, Fig. 2, to the group selection key, such as key 1 of Fig. 2, to ground, thereby operating the corresponding group relay GR1 which closes, at its armatures and make contacts 40, the circuits 76 to 79 which extend to the make contacts of the storage relays Q1, Q2, Q4 and Q8 in the storage group 32 for item No. 1. Preferably, and as shown, these are polar relays of the type disclosed in the aforesaid Bush patent, which when energized by positive battery attract their armatures 75 to closed circuit positions, and when energized by negative battery the armatures are operated to their open circuit positions. The armatures remain in their last-operated positions when the energizing current through the relays is discontinued, i. e., they are of the "stay put" type.

The rotary switch RS of Fig. 4 remains locked to the first calling operator's set, in this case set No. 1, regardless of the calls of other operators until the first operator's RLS relay, Fig. 2, operates in a manner hereinafter set forth and interrupts the start key ground potentials applied to the rotary switch RS and cut-off relay CO.

*Checking or reading operations.*—The desired group selection key, such as key 1 in row 22 of Fig. 2, is depressed by the operator or clerk, and since this is a locking type of key it remains operated until subsequently released by the operator or clerk. Various suitable means, both mechanical and electrical, for locking push buttons or other keys in their depressed or operated positions, and for subsequently releasing or restoring the keys to their unoperated positions, are well known in the communication art therefore are not illustrated herein. The Check key 85 is then depressed and this also is a locking key which remains operated or depressed until subsequently released by the operator or clerk. The non-locking Start key 26 is then depressed and since the start key is not of the locking type it must be held down manually until the checking operation is completed. When the group gang relay, such as relay GR1 of Fig. 5, operates, those storage group relays Q1 to Q8 of the selected storage group 32 which previously had been operated to their circuit-closing positions, cause ground potentials to be applied through their armatures and make contacts 75 to certain of the conductors 76 to 79. The ground potentials thus applied continue through the armatures and make contacts 40 of operated relay GR1 to certain of the conductors 81 to 84 and thence through corresponding conductors 1, 2, 4, 8 of cable 71, Fig. 3, to the operator's set of Fig. 2 and through contacts of operated relay CN and cable 88 to the upper windings of the corresponding relays L1, L2, L4 and L8. Certain of these relays operate depending upon which of the storage relays Q1, Q2, Q4 and Q8 are in their circuit closing positions. The relays L1 to L8 of Fig. 2 upon operating, partially prepare a locking path through their innermost lower armature and make contacts 90 to conductor 92 and armature 91 of release relay RLS, the locking circuit being closed to the grounded make contact of the release relay when it operates. Those of the relays L1 to L8 of Fig. 2 which are operated, cause battery to flow through their lower armatures and make contacts 104, and certain of the conductors 1 to 5 to corresponding lamps 25 and light the lamps thereby to indicate the number of units available, as determined from the condition of the storage group relays 32 of Fig. 5. At the left of the lamps are the numerals 1, 2, 4, 8 which indicate the numerical value represented by each of the lamps. The numerical information thus indicated may, in a reservation system of the character hereinbefore referred to, tell the operator or clerk how many seats or reservations are available in a certain flight, train, or other conveyance.

Figure 4:
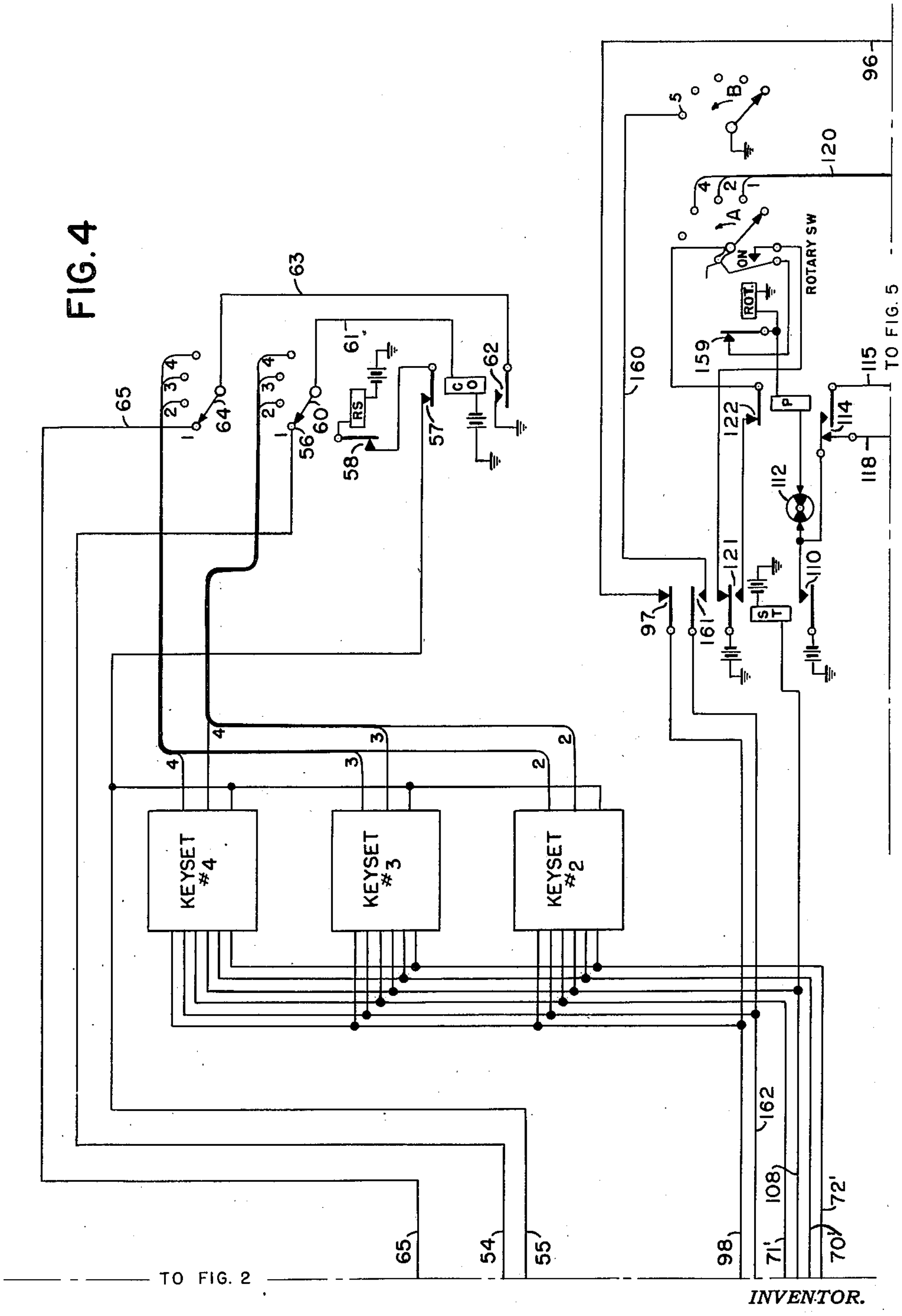
Fig. 4 illustrates a plurality of other clerk's keysets and associated seeker and pulsing equipment.

Coincident with an indication to the clerk or other operator that the Check operation has been completed, the upper armature and make contact 95 on the operated GR1 relay, Fig. 5, causes ground potential to be applied to conductor 96, the circuit continuing through the upper armature and break contact 97 of unoperated relay ST, Fig. 4, conductor 98, contacts of the operated relay CN, Fig. 2, right hand winding of relay RLS, conductor 99, and closed contacts 85 of the Check key to grounded battery 86, thereby operating relay RLS in the keyset. The locking circuit for relay RLS is completed at its armature and make contact 100, the locking circuit continuing through conductor 101 to the left hand contact and spring of the Start key 26 to ground, so that relay RLS is held operated so long as key 26 is depressed. The operation of relay RLS also supplies a locking ground at its armature and make contact 91 and conductor 92 to the locking armatures and make contacts 90 of the operated ones of the relays L1 to L8, and thence through the lower windings of the operated relays to grounded battery.

Relay RLS, upon operating, also opens at its armature and break contact 66 the operating circuit of relay CN which releases and disconnects the keyset from the common equipment. The energizing pulses to the upper windings of relays L1–L8, flow through circuits as traced in the preceding paragraph. These circuits are not interrupted until after the lower (holding) windings of the same relays have been energized. Note that each of these holding windings is connected to its own locking contacts 90 and that the locking circuit 92 is grounded by operation of relay RLS. Hence the locking circuits are immediately effective, whereas the circuits to the upper (operate) windings of relays L1–L8 are not opened until relay CN releases, that is, after the operate circuit for relay CN has been opened at contacts 66 of operated relay RLS. The operation of RLS also opens, at its armature and break contacts 52, 53, the ground potentials on conductors 50 and 51 which had been applied by the actuation of the Start key 26, so that the circuits 54 and 55 extending to the finder switch RS of Fig. 4 are opened, and the finder switch is free to seek out the next keyset desiring access to the common equipment.

As hereinbefore stated, those of the relays L1 to L8 which are operated cause corresponding lights 1 to 8 to indicate the value stored in the storage group GR1. For example, if relays L1 and L4 are operated, these cause lamps 1 and 4 to burn, and the clerk or operator knows that the number 5 is stored on the selected storage relay group. The operated ones of relays L1 to L8 and the corresponding lights remain energized because relay RLS has remained locked to the Start key. When the Start key manually is released by the operator or clerk, the relays L1 to L8 release and the lamps are extinguished, leaving the keyset ready to initiate another operation. It will be noted that the reading operation is performed with a minimum amount of equipment and that any of the selected groups of storage relays corresponding to the desired item may be read substantially instantaneously upon the depression of the Check and Start keys of Fig. 2, so that no time is lost in obtaining the exact condition or available number of seats or space in a conveyance, and this is likewise true irrespective of the nature of the information or of the items concerning which information is stored on the storage relays.

*Additive circuits.*—Assuming for example that the clerk or other operator at the keyset of Fig. 2 wishes to add a quantity, for example the quantity 1, to the value stored in a particular storage group GR1 to GR15. Such operation is particularly desirable in a system of the character disclosed in order that the cancellation of a reservation previously made and stored on the storage groups may quickly and easily be effected and this information conveyed to the storage groups and their settings changed accordingly. In such case the operator depresses a group selection key 22, Fig. 2, corresponding to the storage group for that flight, and also depresses #1 of the "Number of Units Required" keys 23 which in this operation represents the number of cancellations. These keys are connected in permutation to the three conductors 1, 2, 4 in cable 70, the different keys therefore sending permutation code signals, when depressed, to indicate the particular values thereof. The keys 23 are each a locking type key which, when actuated, remains locked in its actuated position until it is subsequently released by manual operation. The operator then depresses the Add key and the Start key 26. The operation of the Start key causes the selector switch RS of Fig. 4 to connect the keyset to the common equipment provided the common equipment is idle, in the manner hereinbefore explained in regard to the checking operation. This results in the operation of the CN relay of Fig. 2 and the subsequent operation of one of the GR relays, for example, relay GR1 of Fig. 5. The operation of the Add key causes a circuit to be established from ground through its contacts 107, contacts of the operated relay CN, conductor 108, and winding of relay ST, Fig. 4, to grounded battery, causing the ST relay to operate.

The operation of relay ST, at its armature and make contact 110, connects battery through the motor driven interrupter 112 to the winding of pulse relay P and thence to the stepping magnet ROT of a rotary switch. Interrupted battery pulses through the interrupter 112 cause the P relay and the rotary switch magnet to pulse. With each operation of the P relay, battery on the make-before-break contacts 114 is connected over conductor 115 to one end of the left hand operate windings of relays R1, R2, R4 and R8 of Fig. 3. The other ends of the left hand windings of these relays respectively are connected to conductors 81 to 84, which conductors extend to the make contacts and armatures 40 of the group relay GR1, Fig. 5, and thence through conductors 76 to 79 to the make contacts and armatures 75 and thence to ground through the operated ones of the storage relays Q1 to Q8 in the selected storage group.

Let us assume that the relays Q1 and Q2 currently are operated, representing the number 3. The corresponding relays R1 and R2 of Fig. 3 would operate over the circuits just described. When relay P of Fig. 4 releases, the battery on the make-before-break contacts 114 is transferred to conductor 118 and thence to the inner armatures and make contacts 122 of the operated relays R1 and R2, Fig. 3, and through the right hand locking windings of the relays to ground, thereby holding relays R1 and R2 energized. These relays remain locked, but the other relays R4 and R8 cannot operate until relay P again reoperates. Let us further assume that key 1 in the "Number of Units Required" column of Fig. 2 has been depressed. When the relay P, Fig. 4, releases, due to the operation of the interrupter 112, the magnet ROT of the rotary switch also releases, causing the rotary switch wiper of bank A to advance to terminal 1, it being understood that the switch wiper of bank B also is rotated one step. In position 1 of switch bank A, battery is applied through the armature and make contact 121 of operated relay ST, break contact and armature 122 of unoperated relay P, and thence through the wiper arm and contact 1 of switch bank A to conductor 1 in cable 120, the circuit continuing through conductor 1 of cable 120 and the operate winding of relay 1, Fig. 3, and thence through conductor 1 of cable 70 to the actuated key 23 to ground in the keyset, Fig. 2, and relay 1 of Fig. 3 operates.

Figure 3:
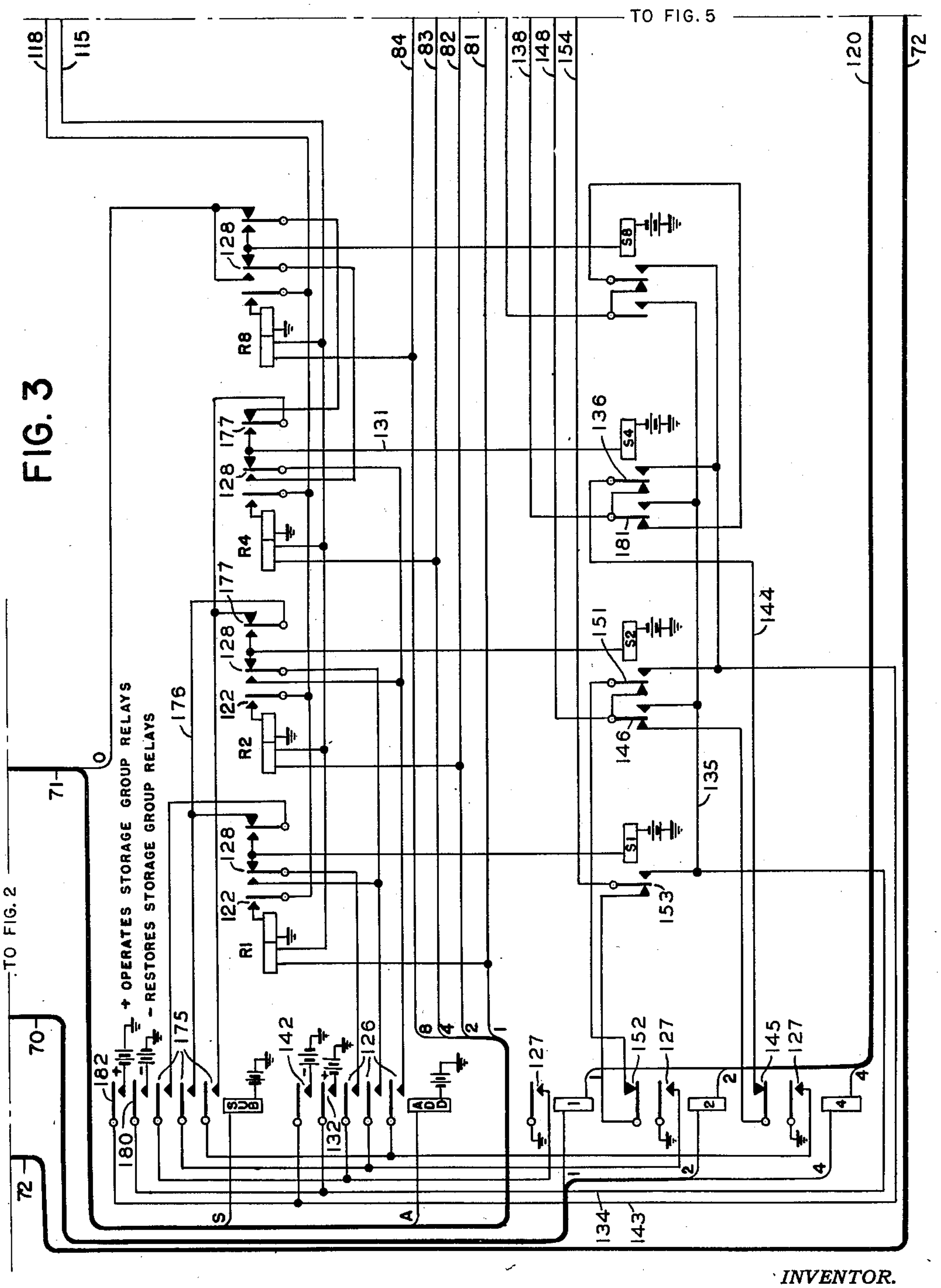
Fig. 3 shows computing relay circuits controlled jointly by the keyset and the signal storage elements of the system.

The actuation of the Add key, Fig. 2, also applies ground potential through its contacts 124 and contacts of operated relay CN to conductor A in cable 71, the circuit continuing through the operate winding of the Add relay, Fig. 3 to grounded battery, causing the latter relay to operate. The three inner armatures and make contacts 126 of the Add relay connect the contacts 127 of relays 1, 2 and 4 to armatures 128 of the relays R1, R2, R4 and R8, and thence to the windings of relays S1, S2, S4 and S8 in such manner as to effect additive operations. When relay 1 operated as described above, its upper armature and make contact 127 applied ground potential through the armature and third make contact 126 of relay Add, and through the armature 128 and associated make contact of operated relay R1 and the corresponding armature 128 and make contact of operated relay R2, thence through the armature 128 and associated break contact of unoperated relay R4, conductor 131 and operate winding of relay S4 to grounded battery. Relay S4 operates and connects positive battery from armature and make contact 132 of relay Add, conductors 134 and 135, make contact and outer armature 181 of relay S4, conductor 138, armature and make contact 140 of relay GR1, Fig. 5, conductor 141 to the winding of relay Q4 in storage group 32, operating relay Q4. At the same time relay S4, Fig. 3, connects negative battery, which is supplied through upper armature and make contact 142 of relay Add and conductor 143, to a circuit comprising make contact and armature 136 of operated relay S4, conductor 144, armature and break contact 145 of relay 2, outer break contact and armature 146 of unoperated relay S2, conductor 148, make contact and armature 149 of relay GR1, Fig. 5, and conductor 150 and winding of relay Q2 to ground. The negative battery thus applied to the relay Q2 causes it to be released and open the circuit formerly made through its armature and make contact. The same negative battery which released relay Q2 is extended through break contact and armature 151 of relay S2, Fig. 3, and thence through the upper armature and break contact 152 of relay 2, break contact and armature 153 of unoperated relay S1, conductor 154, make contact and armature 155 of group relay GR1, Fig. 5, and conductor 156 through the winding of relay Q1 to ground, thereby causing storage relay Q1 to release and open the circuit formerly made through its armature and make contact 75. The final result of these operations is that relay Q4 remains operated which is the correct result of adding 1 to the previously stored quantity of 3.

When the motor-driven interrupter 112, Fig. 4, again supplies battery to pulse relay P and the rotary switch, the operation of relay P at its make-before-break contacts 114 removes the locking battery from conductor 118 and hence from relays R1 and R2 of Fig. 3; this causes the latter relays to release since the storage relays Q1 and Q2 of Fig. 5 are no longer operated to their circuit closing positions. At the same time the battery supplied over conductor 115 to the operate windings of the R1 to R8 relays has caused relay R4 to operate due to the closure of the armature and make contact 75 of storage relay Q4. When pulse relay P and the rotary switch release at the end of the pulse, relay R4 remains locked over conductor 118, and the rotary switch advances to bank contact No. 2 where its wiper applies battery to conductor 2 in cable 120 and thence to one end of the operate winding of relay 2 of Fig. 3.

If one of the "Number of Units Required" keys of Fig. 2 had been operated, for example, key 2, this would have applied ground potential to conductor 2 of cable 70 and caused the operation of relay 2, and the step of adding two to the existing total would have been carried out. In this case since storage relay Q2 is unoperated, the positive battery from the armature 146 and associated make contact of operated relay S2 would have been applied to conductor 148 and thus have operated storage relay Q2, and no other Q relays would have been released. However, in the example given, the relay 2 of Fig. 3 does not operate and nothing further happens until relay P and the rotary switch of Fig. 4 again are pulsed. The pulsing of the rotary switch continues until the last terminal 5 on its contact bank B is reached, thereby showing that the end of the adding cycle has been completed. In this position of the switch wiper of bank B, ground potential is applied through the wiper arm, bank terminal 5, conductor 160, armature and make contact 161 of operated relay ST, conductor 162, contacts on the CN relay, Fig. 2, conductor 163, left hand winding of relay RLS, conductor 164, and contacts 106 of the Add key to grounded battery 86. Relay RLS operates and locks through its armature 165 and make contact to conductor 101 and the left hand contacts of the depressed start key 26. The operation of relay RLS also opens, at its armature and break contact 66, the energizing circuit for relay CN and thereby disconnects the keyset from the common equipment as described under the "check" operation. When the CN relay is released by the operation of relay RLS, the operating circuit 108 for the start relay ST, Fig. 4, is opened. The release of relay ST connects battery through its armature 121 and break contact to the off-normal contacts ON of the rotary switch. Since the switch is off normal the contacts ON are closed and the battery is extended through the self-interrupting contacts 159 to the rotary switch stepping magnet ROT. This causes the switch to buzz home in which position the ON contacts open the buzzing circuit.

While the R1 to R8 relays of Fig. 3 were being operated as described above, the L1 to L8 relays in the keyset of Fig. 2 were duplicating these operations since their operate windings are connected in multiple with the R1 to R8 relays. When RLS operated, the L4 relay was the only one operated and this locked to the armature and make contact 91 of the RLS relay. The L4 relay and the corresponding lamp 4 remain energized until the start key 26 is released which, at its left hand contacts, releases the RLS relay.

A feature of the circuit is that if an attempt should be made to carry out an impossible operation, such as adding 4 to an existing number of 14 which would give a total exceeding the storage capacity of the four Q relays, a signal lamp 0 on the keyset will be lit. This is accomplished by a series circuit through armatures 128 and make contacts of the R1 to R8 relays, which circuit applies ground potential to conductor 0 in cable 71 and causes operation of the LO relay in the keyset, thus lighting the 0 lamp to give a warning or indication of such condition. In the example cited, ground potential would be applied from the armature and make contact 127 of relay 4, Fig. 3, through the innermost armature and make contact 126 of relay Add, armature 128 and make contact of operated relay R4, armature 128 and make contact of operated relay R8 to conductor 0 in cable 71. It will be appreciated that in the example given relays R8, R4 and R2 would be operated to represent an existing total of 14.

*Subtractive circuits.*—The subtractive circuits and their manner of operation will now be described in connection with a typical example. Assume that the operator or clerk has made the check operation above described and has ascertained that there are available seats or reservations in regard to a particular plane or train concerning which a traveler has inquired. Assume further that the storage relays Q1 and Q4 of Fig. 5 in storage group 32 are currently operated to their circuit closing positions thereby indicating that five seats or reservations are available in the plane or train corresponding to Item 1, and that the traveler desires to reserve two seats therein. The operator or clerk has depressed the appropriate group selection key of Fig. 2, key 2 in the number of units required column, the subtract key SUB, and is holding down the start key 26. As previously described, the keyset seeker switch of Fig. 4 connects the keyset to the common equipment by operating the CN relay in the keyset, and the group selection key operates the relay GR1 of Fig. 5 thereby connecting the storage group for Item 1 to the common equipment. The subtract key, Fig. 2, at its contacts 171 applies ground potential to conductor S in cable 71 which causes operation of relay SUB of Fig. 3. Ground potential has also been applied by the subtract key, at its contacts 170, to conductor 108 and consequently to the start relay ST of Fig. 4. Operation of relay ST starts the rotary switch ROT stepping as hereinbefore described, and after two steps the switch arm reaches terminal 2 of bank A. Battery is applied through armature 121 and make contact of operated relay ST, armature 122 and break contact of unoperated relay P, switch wiper arm of bank A, conductor 2 in cable 120, and causes the operation of relay 2, Fig. 3, since the other end of the relay winding is grounded at depressed key 2 in the keyset. The prior operation of relay P of Fig. 4 had resulted in relays R1 and R4 of Fig. 3 being operated, so that the operation of relay 2 at its armature and make contact 127 applies ground potential through an armature and make contact 175 of relay SUB, the circuit continuing through conductor 176, armature 177 and associated break contact of unoperated relay R2, armature 177 and associated make contact of operated relay R4, conductor 131 and the winding of relay S4 to grounded battery, thereby operating the latter relay. The operation of S4 closes a circuit which comprises negative battery from make contact and armature 180 of operated relay SUB, conductors 134 and 135, armature 181 and associated make contact of relay S4, conductor 138, armature and contact 140 of operated relay GR1, Fig. 5, conductor 141 and winding of polar relay Q4 to ground, thereby restoring relay Q4 to its open circuit position. Relay S4 also closes a circuit which comprises positive battery from make contact and armature 182 of relay SUB, conductor 143, armature 136 and make contact of relay S4, conductor 144, armature 145 and break contact of unoperated relay 4, armature 146 and break contact of unoperated relay S2, conductor 148, armature and make contact 149 of operated relay GR1, Fig. 5, conductor 150 and winding of polar relay Q2 to ground, causing operation of Q2 to its circuit closing position. This leaves the armatures of relay Q2 and Q1 operated to their closed circuit positions, which is the proper result of subtracting numeral 2 from 5. Since no other action is required, the rotary switch ROT of Fig. 4 continues to step until the last terminal 5 on bank B is reached, and the RLS relay in the keyset is operated in a manner hereinbefore described. The operation of relay RLS releases the keyset from the common equipment which restores to normal.

Various modifications of the circuit arrangement shown, and various equivalents or substitutes for the devices illustrated, will readily occur to those versed in the art without departing from the spirit and scope of the present invention. The disclosure, therefore, is for the purpose of illustrating the principles of the invention which is not to be regarded as limited except as indicated by the scope of the appended claims.

What is claimed is:

1. A reservation system for aircraft and other conveyances comprising a plurality of groups of electro-responsive signal storage devices, said groups respectively being adapted to store signals representative of the number of seats currently available for different flights or trips, means for reading at any of a plurality of distant stations the number currently stored on any of said storage groups comprising indicating means at each station for displaying said number, means at each station comprising manually operable switch members for selecting a desired storage group and for initiating a request for said information, line conductors and electrical seeker and relay apparatus responsive to the actuation of said switch members for operatively connecting the selected group of storage devices to said indicating means of a calling station, said conductors and relay apparatus including means automatically operable for energizing said indicating means to display the number currently stored on the selected group of storage devices, said stations each having other manually operable switch members for making reservations and for canceling reservations previously made in regard to any of said flights or trips, means including electro-responsive computing equipment common to said stations and said plurality of signal storage groups and controlled by the operation of said selecting and other switch members of a calling station for currently changing the number stored on the selected group of storage devices in accordance with the number of reservations made or canceled by the calling station, and means including said seeker apparatus for preventing the connection of the computing equipment to more than one calling station at any one time.

2. A system for making reservations in regard to aircraft and other conveyances comprising a plurality of electro-responsive signal storage means respectively assignable to different flights or trips for storing numbers representing reservation information in regard thereto, a plurality of calling stations each having manually operable signal generating means and electro-responsive posting means for visually displaying reservation information selectively in regard to said flights or trips, apparatus responsive to signals generated by any of said calling stations for selecting a particular one of said storage means, means controlled by the selected storage means for energizing said posting means at the calling station to display there the desired reservation information, means responsive to signals generated by said calling station for operating the selected storage means to change the number stored therein either to register a new reservation or to cancel a reservation previously made, and means for preventing the selection of any one of said storage means by more than one calling station at a time.

3. A system for making reservations in regard to aircraft and other conveyances comprising a plurality of electro-responsive signal storage means respectively assignable to different fligths or trips for storing numbers representing reservation information in regard thereto, a plurality of calling stations each having manually operable signal generating means and electro-responsive posting means for visually displaying reservation information selectively in regard to said flight or trips, apparatus responsive to signals generated by said calling station for selecting and seizing a particular one of said storage means, means controlled by the seized storage means for energizing said posting means at the calling station to display there the desired reservation information, and means automatically operative to cause release of the seized storage means as soon as the posting means at the calling station has been energized, thereby to make the storage means immediately accessible to another calling station.

4. Apparatus for registering and reporting variable inventory values in respect to a plurality of different items, comprising storage apparatus having a plurality of signal storage sections for storing numerical information, one for each of said items concurrently stored, a computer common to all of said storage sections, a plurality of calling stations having signaling means therein for causing said computer to function in a manner such that a given number may be added to or subtracted from the number previously stored in a selected storage section, check means operable in response to an inquiry signal from any of said calling stations whereby information in regard to the current inventory balance of an item stored in a selected storage section may be manifested at the inquiring station, and lock-out means for preventing the seizure of said registering apparatus by any other calling station until the sought-for inventory information has been reported to said inquiring station.

5. An electrical storage and signaling system comprising a central station having an inventory storage device which includes a plurality of signal storage sections respectively for storing inventory balances of a plurality of different items of information, a computer common to the requirements of all said storage sections for changing the inventory balances therein under control of signals representing amounts to be added to or subtracted from the balances previously stored in said storage sections, a plurality of calling stations each having means therein for seizing said central station while locking out other calling stations from such seizure, said seizure means including means for selecting a desired storage section in which the item balance is to be interrogated or changed in value, means at each calling station for manifesting answer-back signals which convey information regarding the current inventory status of a selected storage section, means at each calling station for transmitting signals of numerical significance for computational response by said computer, and means for causing said computer to introduce the new balance effects of such response into the selected storage section.

6. A system for ascertaining available space, and for making reservations or cancellations, in regard to any of a plurality of aircraft or other conveyances, comprising a central station with storage apparatus common to a plurality of calling stations and having signal storage sections respectively for storing numerical space information in regard to said aircraft or other conveyances, a computer common to said storage sections, said plurality of calling stations each having manually operable means for transmitting signals to effect selection, inquiry, reservation and cancellation operations and including signal means controlled by answer-back signals for manifesting the requested information, means at the central station responsive to selection and inquiry signals from a calling station for selecting the proper signal storage section and for transmitting to said calling station an answer-back signal comprising the requested information in regard to available space as determined from the selected signal storage section, means at the central station responsive to selection signals accompanied either by reservation or cancellation signals transmitted by a calling station for selecting the proper signal storage section and reading out the numerical space information stored therein to said computer, means for causing the computer to respond to the reservation or cancellation signals received from the calling station and the signals read out from the selected storage section and to cause the new balance obtained by the computer to be introduced into said storage section, and means automatically operative to cause release of said common storage and computer apparatus at the central station upon completion of an inquiry, reservation or cancellation operation thereby to make the apparatus immediately accessible to another calling station.

7. A system for ascertaining available space, and for making reservations or cancellations, in regard to any of a plurality of aircraft or other conveyances, comprising a central station with storage apparatus common to a plurality of calling stations and having signal storage sections respectively for storing numerical space information in regard to a plurality of aircraft or other conveyances, a computer common to said storage sections, said plurality of calling stations each having manually operable means for transmitting signals to effect selection, inquiry, reservation and cancellation operations and including signal means controlled by answer-back signals for manifesting the requested information, means at the central station responsive to selection and inquiry signals from a calling station for selecting the proper signal storage section and for transmitting to said calling station an answer-back signal comprising the requested information in regard to available space as determined from the selected signal storage section, means at the central station responsive to selection signals accompanied either by reservation or cancellation signals transmitted by a calling station for selecting the proper signal storage section and reading out the numerical space information stored therein to said computer, means for causing the computer to respond to the reservation or cancellation signals received from the calling station and the signals read out from the selected storage section and to cause the new balance obtained by the computer to be introduced into said storage section, means for preventing the seizure of said common storage and computer apparatus by more than one calling station at a time, and means automatically operative to cause release of said common storage and computer apparatus upon completion of an inquiry, reservation or cancellation operation thereby to make the apparatus immediately accessible to another calling station.

8. An electrical storage and signaling system comprising storage apparatus having signal storage sections respectively assignable to different items of information for storing numbers representing inventory data in regard thereto, a plurality of calling stations each having manually operable means for transmitting signals to effect selection of a particular storage section and numerical signals representing inventory data to be entered in the selected storage section, each station having electro-responsive posting means for visually displaying inventory data selectively in regard to said items, apparatus responsive to selection signals transmitted by any of said calling stations for selecting a particular one of said storage sections, means controlled by the selected storage section for energizing said posting means at the calling station to display there the desired inventory data, a computer common to a plurality of said storage sections, means including said computer responsive to the numerical signals transmitted by said calling station for changing the number stored in the selected storage section to register a new inventory balance, and means for preventing the selection of any one of said storage sections and the seizure of said computer by more than one calling station at a time.

9. A system for making reservations with regard to aircraft and other conveyances, comprising a central station with storage apparatus common to a plurality of calling stations and having signal storage sections respectively assignable to different flights or trips for storing numbers representing current reservation data in regard thereto, and a computer common to said storage sections, said plurality of calling stations each having manually operable means for transmitting a signal to effect selection of a particular storage section and numerical signals representing reservation data to be entered in the selected storage section, each calling station including visual signal means controlled by the central station apparatus for indicating the reservation status as determined from the said storage sections, means at the central station responsive to said selection and numerical signals from a calling station for selecting the proper signal storage section and reading out to said computer the number stored in the selected storage section, means for causing the computer to respond to the numerical signals received from the calling station and the number read out from the selected storage section and to cause signals representing the new balance obtained by the computer to be introduced into said storage section, means automatically operative to prevent the selection of said storage and computer apparatus at the central station by more than one calling station at a time and means automatically operative to release said apparatus upon completion of a reservation operation thereby to make the apparatus immediately accessible to another calling station.

10. A system for making reservations with regard to aircraft and other conveyances, comprising a central station with storage apparatus common to a plurality of calling stations and having signal storage sections respectively assignable to different flights or trips for storing numbers representing current reservation data in regard thereto, and a computer common to said storage sections, said plurality of calling stations each having manually operable means for transmitting a signal to effect selection of a particular storage section and numerical signals representing reservation data to be entered in the selected storage section, each calling station including electrical signal means for indicating the reservation status as determined from the said storage sections, means at the central station responsive to said selection and numerical signals from a calling station for selecting the proper signal storage section and reading out to said computer the number stored in the selected storage section, means for causing the computer to respond to the numerical signals received from the calling station and the number read out from the selected storage section and to cause signals representing the new balance obtained by the computer to be introduced into said storage section, circuit means controlled by said computer for causing said electrical signal means at the calling station to give an indication if and when the new balance obtained by the computer exceeds a predetermined maximum number, means automatically operative to prevent the selection of said storage and computer apparatus at the central station by more than one calling station at a time and means automatically operative to release said apparatus upon completion of a reservation operation thereby to make the apparatus immediately accessible to another calling station.

11. A system for making reservations with regard to aircraft and other conveyances, comprising a central station with storage apparatus common to a plurality of calling stations and having signal storage sections respectively assignable to different flights or trips for storing numbers representing current reservation data in regard thereto, and a computer common to said storage sections, said central station also including a line selector having a series of contacts respectively connected to circuits for interconnecting the calling stations with the central station, said plurality of calling stations each having manually operable means for applying over one of said interconnecting circuits an electrical potential to its associated contact in said line selector and for transmitting a signal to effect selection of a particular storage section and numerical signals representing reservation data to be entered in the selected storage section, each calling station including electrical signal means for indicating the reservation status as determined from the said storage sections, means at the central station for causing said line selector to scan its series of contacts and to respond to the potential applied to one of the contacts by a calling station to operatively connect that station to the central station apparatus, other means at the central station responsive to said selection and numerical signals from the calling station for selecting the proper signal storage section and reading out to said computer the number stored in the selected storage section, means for causing the computer to respond to the numerical signals received from the calling station and the number read out from the selected storage section and to cause signals representing the new balance obtained by the computer to be introduced into said storage section, circuit means controlled by said computer for causing said electrical signal means at the calling station to give an indication if and when the new balance obtained by the computer exceeds a predetermined maximum number, means including said line selector automatically operative to prevent the selection of said storage and computer apparatus at the central station by more than one calling station at a time and means automatically operative to release said apparatus upon completion of a reservation operation thereby to make the apparatus immediately accessible to another calling station.

12. An electrical storage and signaling system comprising a central station with storage apparatus common to a plurality of calling stations and having signal storage sections respectively assignable to different items of information for storing numbers representing current inventory data in regard thereto, and a computer common to said storage sections, said plurality of calling stations each having manually operable means for transmitting a signal to effect selection of a particular storage section and numerical signals representing inventory data to be entered in the selected storage section, each calling station including visual signal means controlled by the central station apparatus for indicating the inventory status as determined from the said storage sections, means at the central station responsive to said selection and numerical signals from a calling station for selecting the proper signal storage section and reading out to said computer the number stored in the selected storage section, means for causing the computer to respond to the numerical signals received from the calling station and the number read out from the selected storage section and to cause signals representing the new balance obtained by the computer to be introduced into said storage section, means automatically operative to prevent the selection of said storage and computer apparatus at the central station by more than one calling station at a time and means automatically operative to release said apparatus upon completion of the introduction of the new balance into said storage section thereby to make the apparatus immediately accessible to another calling station.

13. An electrical storage and signaling system comprising a central station with storage apparatus common to a plurality of calling stations and having signal storage sections respectively assignable to different items of information for storing numbers representing current inventory data in regard thereto, and a computer common to said storage sections, said plurality of calling stations each having manually operable means for transmitting a signal to effect selection of a particular storage section and numerical signals representing inventory data to be entered in the selected storage section, each calling station including electrical signal means for indicating the inventory status as determined from the said storage sections, means at the central station responsive to said selection and numerical signals from a calling station for selecting the proper signal storage section and reading out to said computer the number stored in the selected storage section, means for causing the computer to respond to the numerical signals received from the calling station and the number read out from the selected storage section and to cause signals representing the new balance obtained by the computer to be introduced into said storage section, circuit means controlled by said computer for causing said electrical signal means at the calling station to give an indication if and when the new balance obtained by the computer lies outside of a predetermined range of inventory values for said item, means automatically operative to prevent the selection of said storage and computer apparatus at the central station by more than one calling station at a time and means automatically operative to release said apparatus upon completion of its current operation thereby to make the apparatus immediately accessible to another calling station.

14. An electrical storage and signaling system comprising a central station with storage apparatus common to a plurality of calling stations and having signal storage sections respectively assignable to different items of information for storing numbers representing current inventory data in regard thereto, and a computer common to said storage sections, said central station also including a line selector having a series of contacts respectively connected to circuits for interconnecting the calling stations with the central station, said plurality of calling stations each having manually operable means for applying over one of said interconnecting circuits an electrical potential to its associated contact in said line selector and for transmitting a signal to effect selection of a particular storage section and numerical signals representing inventory data to be entered in the selected storage section, each calling station including electrical signal means for indicating the inventory status as determined from the said storage sections, means at the central station for causing said line selector to scan its series of contacts and to respond to the potential applied to one of the contacts by a calling station to operatively connect that station to the central station apparatus, other means at the central station responsive to said selection and numerical signals from the calling station for selecting the proper signal storage section and reading out to said computer the number stored in the selected storage section, means for causing the computer to respond to the numerical signals received from the calling station and the number read out from the selected storage section and to cause signals representing the new balance obtained by the computer to be introduced into said storage section, circuit means controlled by said computer for causing said electrical signal means at the calling station to give an indication if and when the new balance obtained by the computer does not lie within a predetermined premissible range of inventory values for said item, means including said line selector automatically operative to prevent the selection of said storage and computer apparatus at the central station by more than one calling station at a time and means automatically operative to release said apparatus upon completion of its current operation thereby to make the apparatus immediately accessible to another calling station.

HAROLD F. MAY.

REFERENCES CITED

The following references are of record in the file of this patent:

UNITED STATES PATENTS

| Number | Name | Date |
|---|---|---|
| 1,876,296 | Hofgaard | Sept. 6, 1932 |
| 2,088,942 | Boswau et al. | Aug. 3, 1937 |
| 2,099,754 | Robinson | Nov. 23, 1937 |
| 2,236,793 | Furber | Apr. 1, 1941 |
| 2,318,591 | Couffignal | May 11, 1943 |
| 2,340,809 | Hatton et al. | Feb. 1, 1944 |
| 2,364,540 | Luhn | Dec. 5, 1944 |
| 2,432,324 | May | Dec. 9, 1947 |
| 2,446,037 | Ammann et al. | June 27, 1948 |